United States Patent Office 3,849,358
Patented Nov. 19, 1974

3,849,358
METHOD OF PREPARING HIGHLY CONCENTRATED RESINOUS LATEX
Masakazu Inoue, Takehiko Okamoto, and Ikuo Nagai, Nagoya, Japan, assignors to Toray Industries, Inc., Tokyo, Japan
Continuation-in-part of abandoned application Ser. No. 160,445, July 7, 1971. This application July 11, 1973, Ser. No. 378,201
Claims priority, application Japan, Oct. 24, 1966, 41/69,759
Int. Cl. C08d 1/09; C08f 15/40
U.S. Cl. 260—29.7 UP                6 Claims

ABSTRACT OF THE DISCLOSURE

Method of preparing a highly concentrated resinous latex (of which polymer has very improved impact strength and colour) based on an elastomeric polymer latex by emulsion polymerization which comprises adding either incrementally or continuously styrene or a mixture of styrene with another monomer, and an emulsifier in a specific proportion based on the amount of monomer added to an elastomeric polymer latex having an average particle diameter of at least $0.15\mu$ in the presence of an initiator.

---

This invention is a continuation-in-part of application Ser. No. 160,445 filed July 7, 1971, now abandoned.

This invention relates to a method of preparing a high solid content latex of an impact resistant resinous material by the emulsion polymerization method using an elastomeric latex as the base.

As a method of improving the impact resistance of polystyrene or styrene acrylonitrile copolymer, a method has been employed in the past of emulsion polymerizing either styrene or styrene and acrylonitrile in the presence of an elastomeric polymer latex such as polybutadiene or butadiene-styrene rubber. From the resulting polymer latex, the resin has been generally recovered by adding to the latex an electrolyte such as sodium chloride or magnesium sulfate and salting out the solid portion therefrom.

In this case the higher the concentration of the solids portion contained in the latex, the more advantageous it becomes from the economic standpoint. Furthermore the polymer having excellent physical properties such as very high impact strength and very improved colour which can not be expected for the product from the conventional low total solid latex can be obtained from a latex having high solid content. However, heretofore the emulsion polymerization for preparation of a high impact resinous material was carried out in the order of 35% by weight solid content at the time of the completion of polymerization reaction.

It was impossible from the practical standpoint to prepare a higher solid content latex by emulsion polymerization since polymerization at concentrations in excess of 35% would cause either a rise in the latex viscosity or the formation of a large amount of a coagulated mass.

Prior to this invention it was known that the direct production by emulsion polymerization of a synthetic rubber latex having fluidity and in addition a high concentration of the solids portion could be accomplished by using devices to decrease the number of polymer particles in the synthetic rubber latex, or emulsion polymerization technique for increasing the particle size by using seed latex and controlling the addition of emulsifier, in the case of PVC (see U.S. Pat. 2,520,959) or other polymers. However, it had not been known how monomers such as styrene and acrylonitrile etc. could be graft-polymerized on a synthetic rubber by means of emulsion polymerization maintaining the high solids content of the emulsion. Furthermore it was known that when the monomers such as styrene and acrylonitrile are emulsion polymerized on to the diene rubber in a highly concentrated emulsion system, the resultant polymer is much improved in physical properties such as impact strength and color and heat stability. This effect is quite unexpected.

It is therefore an object of this invention to provide a method of directly preparing by means of emulsion polymerization an impact-resistant resinous latex whose solids content is at least 50% by weight, preferably even exceeding 60% by weight, and which moreover possesses great fluidity, and to obtain a polymer with improved impact strength and good color and excellent heat stability.

Another object of the invention resides in the production from the foregoing resinous latex of a thermoplastic resinous composition which excels in mechanical properties, particularly in impact resistance, processability and appearance.

It has now been found that by choosing and using as the base elastomeric latex especially one in which the particle diameter is at least 0.15 micron and by adding the emulsifier in a specific amount in relation to the amount of monomer to be added and further by adding the emulsifier incrementally or continuously it is possible to directly obtain by means of emulsion polymerization, without the formation of a coagulated mass, or without causing an increase in viscosity of the latex, a resinous latex of a high degree of concentration in which the concentration of the solids portion exceeds even 60% by weight. Furthermore, by polymerizing in a high concentration emulsion, the physical properties and colour are much improved as compared with the polymer polymerized in a low concentration emulsion.

This invention is a method of graft polymerizing ethylenically unsaturated monomers on an elastomeric polymer of a diene type compound in an emulsion having a high solid content, such method comprising adding, either incrementally or continuously in the presence of a free radical generator, an emulsifier and 92–20 parts by weight of monomers selected from the group consisting of monoalkenyl aromatic monomers and mixtures thereof with one or more acrylic monomers of the formula wherein R is a member selected from the group consisting of hydrogen and methyl and X is a member selected from the class consisting of the —CN and —COOR' groups, wherein R' is an alkyl group having 1 to 4 carbon atoms, 8 to 80 parts by weight, calculated as solids portion, of a polymerized conjugated diolefinic hydrocarbon-containing elastomeric polymer latex, the average particle diameter of the dispersed polymeric particles of which is at least 0.15 micron, the emulsifier being added in an amount corresponding to the amount of monomers added, as defined by the following formula:

$$9\times 10^{-24}\frac{MV_o^{1/3}}{SR_o}V^{2/3} > W+W_o > 4\times 10^{-24}\frac{MV_o^{1/3}}{SR_o}V^{2/3} \quad (1)$$

wherein W is the number of parts by weight of the emulsifier that is required to be added to the polymerization system per 100 parts by weight of the total charge, when a volume V of polymer and monomers is present in the polymerization system, with the proviso that when W is calculated as zero or a minus number, no emulsifier is added to the polymerization system, $W_o$ is the number of parts by weight, per 100 parts by weight of the total charge, of the amount of emulsifier present in the elastomeric polymer latex, as converted on the basis of the effective molecular area of the emulsifier used in the emulsion polymerization reaction, $R_0$ is the average particle radius (cm.) of the particles of the elastomeric polymer latex, M is the molecular weight of the emulsifier used in the emulsion polymerization reaction, S is the area covered (cm.²) per molecule of the emulsifier used in the emulsion polymerization reaction, the average value of the weight of the several components being used when the emulsifier used is a mixture, $V_0$ is the value obtained by dividing the number of parts of the elastomeric polymer by the specific gravity of the polymer, and V is the value obtained by adding the value $V_0$ to the value obtained by dividing the number of parts by weight of the monomers added to the polymerization system at a certain time during the polymerization by the specific gravity of the polymer formed by the said monomers added until that time and continuing the polymerization at a temperature of 40 to 70° C. and at least in the final stage the polymerization is carried out in an emulsion whose solid content is 50–70% by weight.

According to the present invention, a highly concentrated resinous latex having a solid content of 50 to 70% by weight can be directly produced by emulsion graft polymerization.

For the term "area covered per molecule of the emulsifier" as used herein and the appended claims, the value of the so-called effective molecular area obtained by such methods as disclosed in the Journal of Colloid Science, vol. 9, pp. 89, 104, 263 and 382 or other methods is used. The values for the typical emulsifiers are shown in Table A, below.

TABLE A

Effective Molecular Area of some Emulsifiers

| Emulsifier: | Area Covered Per Molecule ($\times 10^{-16}$ cm.²) |
|---|---|
| Sodium laurate | 41.4 |
| Sodium myristate | 34.1 |
| Sodium oleate | 28.2 |
| Sodium palmitate | 25.1 |
| Sodium stearate | 23.4 |
| Disproportionated rosin soap | 43.7 |
| Sodium lauryl sulfate | 37.0 |
| Sodium disulfosuccinic acid | 60–70 |

Further, the value of $W_0$ in the foregoing formula (1) can be calculated in practice in the following manner.

Suppose for example that 80 parts of a monomeric mixture is emulsion graft-polymerized on 20 parts of an elastomeric polymer and the area covered per molecule of the emulsifier present in the elastomeric latex and that of the emulsifier used for the graft polymerization are represented by $S_R$ and $S_G$ respectively, while their molecular weights are represented by $M_R$ and $M_G$ respectively.

Now, if 3 parts of emulsifier were present in advance in the latex per 100 parts of the elastomeric polymer, $W_0$ can be calculated by the following formula (2).

$$(2) \quad W_0 = \frac{20}{100} \times 3 \times \frac{S_R}{S_G} \times \frac{M_G}{M_R}$$

In calculating the average particle radius of the elastomeric polymer latex, there are three methods, i.e., the arithmetic average, the surface average and the weight average. While for computing the amount of addition of the emulsifier in this invention, the surface average particle radius is to be preferred, in actual practice those values based on the arithmetic or weight average may be used.

The polymerized conjugated diolefinic hydrocarbon-containing elastomeric polymers are used as the starting material in the invention method. As examples of these elastomeric polymers, included are the homopolymers or copolymers of the conjugated diolefinic hydrocarbons such as butadiene, isoprene and chloroprene, and the copolymers of these conjugated diolefinic hydrocarbons with the alpha, beta-ethylenically unsaturated monomers copolymerizable therewith such, for example, as styrene and acrylonitrile. Needless to say, these copolymers must be those which demonstrate rubbery elasticity at room temperature. This elastomeric polymer must be in the form of a latex and the average diameter of its particles must be at least 0.15 micron. The size of the particles of the elastomeric polymer latex is a very important factor to obtain the highly concentrated latex in this invention. Namely, it has been found first of all that to obtain a copolymeric resinous latex excelling in impact resistance at a solids portion concentration of above 50% and if necessary, even higher than 60%, the average particle diameter of the elastomeric polymer latex used as the substrate must be at least 0.15 micron, and preferably 0.2–0.35 micron. When an elastomeric polymer latex of an average particle diameter of less than 0.15 micron is used as the base, the viscosity of the polymerization system rises during the emulsion polymerization of the comonomers, and consequently it becomes difficult to attain a solids portion content of above 45% in the final latex product. Further, it has been found that the impact resistance of the end product resin was also greatly affected by the particle diameter of the elastomeric polymer latex and that a pronounced improvement could also be had in the impact resistance of the end product resins by the use of a latex whose average particle diameter was at least 0.15 micron.

The solid content of the elastomeric polymer latex used in the method of the present invention is not particularly limited provided that the concentration of the resinous latex finally obtained is within the range of 50–70% by weight. For instance, even when the content of the starting rubber latex is less than 50% by weight, the final product latex can be obtained in amounts more than 50% by weight requiring the addition of monomers in such an amount as to compensate for the difference in the latex concentration. In general, an elastomeric polymer having a solids portion concentration of 35 to 60% is preferably used. When the solid content of the elastomeric polymer latex is sufficiently high from the start, it is necessary that the latex concentration should be controlled properly throughout the polymerization step by adding water as the dispersing medium.

In the method of the present invention, it is desirable that the elastomeric polymer latex should satisfy the following relationship (3).

$$9 \times 10^{-24} \frac{MV_0}{SR_0} > W_0 > 4 \times 10^{-24} \frac{MV_0}{SR_0} \quad (3)$$

Most commercially available elastomeric polymer latexes satisfy this relationship, and can be used satisfactorily in the method of the present invention.

The control of the latex concentration during polymerization can be effected satisfactorily by adding an emulsifier in the form of an aqueous solution.

The polymerization method of the present invention is applicable to the case of emulsion graft-copolymerizing either a monoalkenyl aromatic monomer or a monomeric mixture of such monoalkenyl aromatic monomer and $\alpha,\beta$-ethylenically unsaturated monomers copolymerizable therewith into the elastomeric polymer.

The monoalkenyl aromatic compounds include compounds represented by the following formula:

wherein $R_1$ is H or $CH_3$, and $R_2$ is H, $CH_3$ or $C_2H_5$.

As the monoalkenyl aromatic compounds, mention can be made of styrene or the styrene derivatives capable of radical polymerization, such as alpha-methyl styrene, vinyl toluene, and o-, m- and p-ethyl styrene. On the other hand, as the other alpha, beta-ethylenically unsaturated monomers which are copolymerizable with the monoalkenyl aromatic compounds, numerous monomers are usable which are copolymerizable with the afore-mentioned monoalkenyl aromatic monomers, but particularly to be preferred are one or more monomers selected from the acrylic monomers of the formula wherein R is a member selected from H or $CH_3$, X is CN or COOR' and R' is alkyl having 1 to 4 carbon atoms. As the acrylic monomers of the foregoing formula, included are such, for example, as acrylonitrile, methacrylonitrile, methyl acrylate, ethyl acrylate and methyl methacrylate. While there are no particular restrictions as to the composition of the monomeric mixture, it is preferred that the monoalkenyl aromatic monomer comprises at least 30% by weight, and particularly above 50% by weight, of the total monomers. Therefore, the acrylic monomers are preferably used in an amount of less than 70% by weight, and particularly less than 50% by weight. Particularly, when X in the acrylic monomers is CN (cyano group), i.e. in the case of, for example acrylonitrile, it is preferred that the acrylic monomer is present in an amount of less than 35% by weight of the total monomers.

Further, the proportion in which the elastomeric polymer and the alpha, beta-ethylenically unsaturated monomers, which are to be polymerized in the presence of the former, is used is also important. Suitably used are 8–80 parts by weight, and preferably 15–70 parts by weight, of the elastomeric polymer to 92–20 parts by weight, and preferably 85–30 parts by weight, of the monomers. When the elastomeric polymer is used in an amount of less than 8 parts by weight, it is a disadvantage in attaining the objective of improving the impact resistance of the resin, one of the important objects of the invention. On the other hand, when the amount of the elastomeric polymer exceeds 80 parts by weight, the amount of the alpha, beta-ethylenically unsaturated monomer being too small the initial objective, which resides in improving the impact resistance of the polymer composed of this monomer, likewise cannot be achieved.

The emulsifier used may be any which is customarily used in emulsion polymerization, but preferred because of their excellent performance are anionic surfactants such as alkali salts of higher fatty acids, e.g., sodium laurate, sodium oleate, disproportionated rosin soap, alkali salts of alkyl benzene sulfonic acids e.g., sodium dodecylbenzene sulfonate, and alkali salts of higher alcohol sulfuric acid esters such as an alkali lauryl sulfate. These anionic surfactants may be used either singly or as a mixture or they may be used as a mixture with a small amount of nonionic surfactants.

As the free radical generator used for the polymerization reaction, the initiators known in the art of emulsion polymerization can be used. Especially preferred are persulfates such as ammonium persulfate and potassium persulfate, and the known Redox initiators. These initiators can be added to the polymerization system in the form of an aqueous solution in an amount that is used in the usual emulsion polymerization method. The initiator can be added to the reaction system in advance of the emulsion polymerization reaction or it can be added in several increments or continuously, the additions being made before the emulsion polymerization reaction as well as during the progress of the reaction. Again, if necessary, it is also possible to use a polymerization regulator or chain transfer agent, such as mercaptans.

While there is no special restriction as to the emulsion polymerization temperature, it is generally preferable to carry out the polymerization reaction at 40° to 70° C. The polymerization is carried out in an atmosphere of an inert gas such as nitrogen and carbon dioxide, and preferably under elevated pressure.

In this invention the aforesaid monomers and emulsifier are separately added incrementally or continuously to the reaction system containing the elastomeric polymer latex and the polymerization initiator. It is not preferable to mix them in advance before addition to the polymerization system. In this case, the amount of emulsifier added must be an amount defined by the foregoing expression (1) in conformity with the total amount of the monomers and polymers present in the polymerization system. If the amount of emulsifier becomes less than the range defined by formula (1) the dispersed polymeric particles have a tendency to cohere and form a coagulated mass, whereas if the amount becomes greater than the range of (1) the viscosity of the latex rises excessively to render the continuance of the polymerization reaction impossible. Therefore, when the emulsifier is added in an amount in conformance with the aforesaid expression (1) at a specified ratio in accordance with the amount of monomers and polymers present in the polymerization system, a resinous latex of high concentration and possessing great fluidity can be obtained. In general, it is preferred that the addition of monomers and the emulsifier is carried out either at a predetermined rate for each of them continuously or incrementally with the additions being made on a plurality of occassions at a given rate and a given interval.

According to the invention, when monomers and the emulsifiers are added stepwise, the rate at which the monomers are added should preferably be such that not more than ⅓ of the total amount used is added to the polymerization system at the beginning of the emulsion polymerization reaction, the remainder being added during the progress of the reaction. On the other hand, the rate at which the emulsifier is added, the amount of which must satisfy that defined by the expression (1), should preferably be such that not more than ¼ of the total amount used is added to the polymerization at the beginning of the emulsion polymerization reaction, the remainder being added during the progress of the reaction.

As may be understood from the above explanation, $W+W_o$ means the amount of the emulsifier present in the emulsion polymerization system. The method of the present invention is characterized in that the emulsion polymerization is carried out while controlling the amount of emulsifier to an amount corresponding to the amount of solids content, or the sum of polymer and monomer, in the polymerization system in conformity with formula (1).

This control of emulsifier must be carried out throughout the whole period of polymerization, but the control may be effected by any means provided that formula (1) be satisfied.

How accurately this control of the amount of emulsifier must be carried out will be understood from some control examples given later.

For a better understanding of the invention, reference is made to the accompanying drawings.

The upper limit curve shown by a dotted line in FIGS. 1 through 9 corresponds to the range derived from the calculation by formula $$W+W_o = 9 \times 10^{-24} \frac{MV^{1/3}}{SR_o} V^{2/3}.$$

Similarly, the lower limit curve corresponds to that from the formula $$W + W_o = 4 \times 10^{-24} \frac{MV_o^{1/3}}{SR_o} V^{2/3}.$$

FIG. 1 is explained by the Example 1 and Control 2, FIG. 2 by the Example 2 and Control 3, FIG. 3 by the Example 3 and Control 7, FIG. 4 by the Example 4, FIG. 5 by the Example 5 and Control 8, FIG. 6 by the Example 6 and Control 4, FIG. 7 by the Example 7, FIG. 8 by the Example 8 and FIG. 9 by the Example 9, respectively.

It was found that not only did the invention method possess numerous advantages from the standpoint of commercial productive operations, but also the resulting resinous latex had many advantages. Namely, the amount of water used in the method of this invention is less than that used in a conventional polymerization. Consequently, when the emulsion polymerization is carried out in a reactor having a certain capacity, a large amount of monomer can be charged as compared with a conventional method and therefore the two-fold amount of the production can be possible using an old equipment.

Further, when the resinous latex obtained by this invention is compared with the conventional resinous latex at the same concentration, not only is its viscosity low and the removal of the reaction heat is easy but also such operations as its transportation is easy and advantageous.

Again, since the resinous latex according to this invention is usually at a high concentration of above 55%, resinous foam can be produced from this latex. (In this case this is impossible with the latex of which concentration is less than 55%.) In addition, this latex has fluidity and it moreover is of high concentration. Therefore, when a film is to be formed on a substrate by dipping in this latex, the amount of resin adhering can be increased.

Further, when the ABS resin (acrylonitrile-butadiene-styrene copolymer resin) is produced according to the invention method, the color tone and heat stability of the polymer is markedly improved. Further, when the ABS resin is prepared in accordance with this invention, the resin obtained has a high impact resistance.

While the resinous latex obtained according to the invention method can be used as-obtained for the production of resinous moulded articles, it is valuable for mixing with such resins as polystyrene or the styrene-acrylonitrile copolymer after separating the polymer particles in the latex in accordance with customary coagulation technique to produce resinous compositions having impact resistance.

The following Examples are to explain the present invention.

Example 1

Polymerization was carried out under nitrogen gas stream at a temperature of 65° C. in a 10-litre reactor according to the following recipe.

RECIPE

| Substance: | Parts (solid portion) |
| --- | --- |
| Polybutadiene latex [1] | 20 |
| Styrene [2] | 56 |
| Acrylonitrile [2] | 24 |
| n-Dodecyl mercaptan [2] | 0.3 |
| Potassium persulfate | 0.3 |

[1] Polybutadiene latex FRS-2004, a product of Firestone Co., of which the solid content is 60% and which has an average particle size of 0.24μ. As emulsifiers, 2.7 parts of disproportionated rosin soap and 0.5 part of potassium oleate are used per 100 parts of the polymer.
[2] Styrene, acrylonitrile and n-dodecyl mercaptan were mixed together beforehand. The mixture was trickled into the reactor at the time when the temperature of the reaction system reached 65° C. The trickling was carried out at a uniform rate for 8 hours.

RECIPE—Continued

| Substance: | Parts (solid portion) |
| --- | --- |
| Potassium sulfate | 0.1 |
| Sodium pyrophosphate | 0.1 |
| Sodium laurate [3] | 1.74 |
| Water [4] | 60 |

Figure 1:
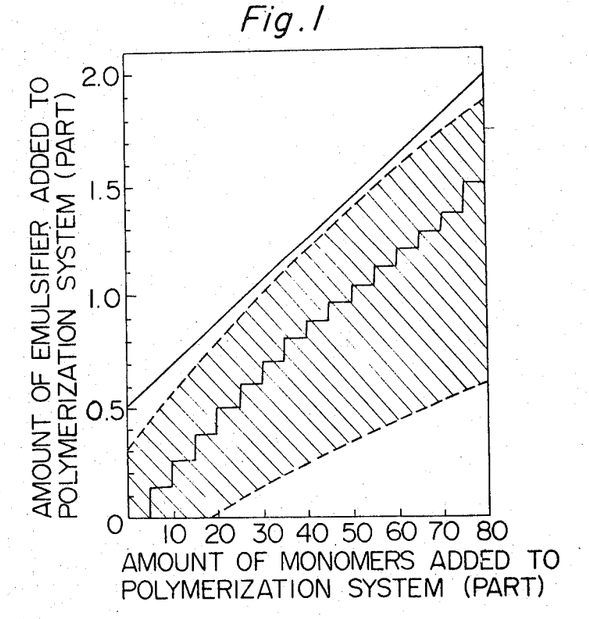
FIGS. 1 to 9 are graphs illustrating the relationship between the amount of monomers added to the polymerization system and the emulsifier added thereto. The area shown with slanted lines represents the range of the amount of emulsifier addition as defined by the aforesaid formula (1).

[3] Sodium laurate as 10% aqueous solution was added stepwise as shown in FIG. 1 in the following procedure; 0.14 part was added until 10 parts of the monomer mixture was trickled; 0.12 parts per 5 parts of the monomer mixture at the points between 10 and 25 parts; 0.10 parts per 5 parts of monomer mixture at the points between 25 and 40 parts; 0.08 part per 5 parts of the monomer mixture at the points between 40 and 75 parts; 0.14 part was added at the point when 75 parts of the monomer mixture were trickled; and 0.24 part was added at the point when 80 parts of the monomer mixture were added. The range of $$9 \times 10^{-24} \frac{MV_o^{1/3}}{SR_o} V^{2/3} \sim 4 \times 10^{-24} \frac{MV_o^{1/3}}{SR_o} V^{2/3}$$

calculated on the formula (1) was shown in FIG. 1. The shaded range shown in FIG. 1 corresponds to the range derived from the calculation by formula (1). The upper limit curve corresponds to the case where $$W + W_o = 9 \times 10^{-24} \frac{MV_o^{1/3}}{SR_o} V^{2/3}$$

and the lower limit curve corresponds to the case where $$W + W_o = 4 \times 10^{-24} \frac{MV_o^{1/3}}{SR_o} V^{2/3}.$$

[4] It contains water in the polybutadiene latex and the aqueous solution of sodium laurate.

The polymerization was carried out under nitrogen gas stream and was terminated after the stirring had been continued for 1.5 hours since the completion of the trickling. The viscosity of the polymer system was low throughout the polymerization and the yield of the coagulated product was low. The solid content of the final latex was as high as 62%; however, it had a low viscosity. The properties of the final latex are as follows;

Solid content: 62% by weight
pH: 9.4
Brookfiled viscosity: 110 cp. (30° C.)
Yield of a coagulated product: 0.8%.

To the so obtained latex 1.0 part, per 100 parts of the polymer, of styrenated phenol emulsified with 0.6 part of potassium oleate and 2.5 parts of water were added. Water and 10% aqueous solution of magnesium sulfate were added to the latex at a ratio of the solid in latex: water: magnesium sulfate solution of 3.5:30:0.15. The mixture was coagulated at a temperature of 80–85° C., dehydrated, washed with water and thereafter dried to yield a powder. After the obtained powder was pelletized, the test pieces were prepared by injection molding according to ASTM. The properties thereof were measured. The results are as follows;

Melt viscosity: 6300 poise
Yield strength: 460 kg./cm.$^2$
Break strength: 375 kg./cm.$^2$
Break elongation: 25%
Izod impact strength: 18 kg. cm./cm. notch (23° C.); 11 kg. cm./cm. notch (−20° C.)

The melt viscosity was measured at 220° C. by a flow-tester commercially available.

In Example 1, the addition of the emulsifier was performed stepwide as shown in FIG. 1, wherein W+Wo is nearly equal to $$8 \times 10^{-24} \frac{MV_o^{1/3}}{SR_o} V^{2/3}.$$

However, as mentioned above, the polymerization could be carried out very stably at a high concentration, and the resin obtained had a high whiteness and excellent physical properties.

Example 2

The polymerization was carried out using the polybutadiene used in Example 1 at a rubber-monomer ratio of 8/92 according to the following recipe. The polymerization was performed, as in Example 1, under nitrogen gas stream, and the mixture of the monomers was added at a uniform rate for 10 hours. The emulsifier was added in a form of 10% aqueous solution.

RECIPE

| Substance: | Parts (solid portion) |
|---|---|
| Polybutadiene latex | 8 |
| Styrene [1] | 65 |
| Acrylonitrile | 27 |
| n-Dodecyl mercaptan [1] | 0.5 |
| Sodium pyrophosphate | 0.15 |
| Potassium persulfate | 0.3 |
| Sodium laurate [2] | 1.3 |
| Water [3] | 53.0 |

Figure 2:
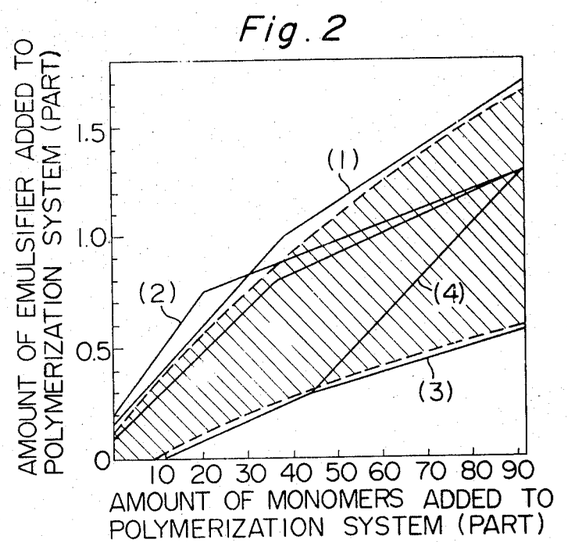

[1] Styrene and acrylonitrile and n-dodecyl mercaptan were mixed together and trickled into the polymer system at a uniform rate.
[2] Sodium laurate was continuously added in accordance with the solid line shown in FIG. 2.
[3] Water in the polybutadiene latex and the emulsifier aqueous solution was also included.

The emulsifier was added, as shown in FIG. 2, at a rate of 0.2 part per 10 parts of the monomer mixture added until the amount of monomer mixture trickled reached 35 parts and at a rate of 0.077 part per 10 parts of the monomer mixture added after the amount of monomer mixture trickled exceeded 35 parts. The polymerization temperature was 65° C., and the polymerization was terminated after the stirring had been continued for 2 hours since the completion of the trickling. The viscosity of the reaction system was very low and there was scarcely any formation of a coagulated product. The properties of the so obtained final latex were as follows;

Solids content: 61.5%
pH: 9.8
Brookfield viscosity: 75 cp. (30° C.)
Yield of the coagulated product: 0.7%.

Styrenated phenol, as a stabilizer, was added to the obtained latex under the same conditions as in Example 1. The mixture was coagulated by magnesium sulfate, dehydrated, washed with water, dried, and thereafter pelletized to yield a product. Testing pieces were prepared by injection molding the pelletized product according to ASTM standard and subjected to stretching test and Izod impact strength test. The results were as follows;

Melt viscosity: 5,300 poise (by a flowtester commercially available at 220° C.)
Izod impact strength: 10.2 kg. cm./cm. notch (room temperature) 6.0 kg. cm./cm. notch (at −20° C.)
Yield strength: 540 kg./cm.²
Break strength: 470 kg./cm.²
Break elongation: 8.7%.

The obtained product was a resin very excellent in physical properties.

Example 3

A SBR latex having an average particle size of 0.17μ, a ratio of butadiene/styrene of 75/25 and the polymer solid content of 45%, was prepared in which disproportionated rosin soap was present in an amount of 3.0 parts per 100 parts of the polymer solid. The polymerization was carried out using the SBR latex as a substrate according to the following recipe.

RECIPE

| Substance: | Parts (solid portion) |
|---|---|
| SBR latex | 45 |
| Styrene [1] | 32 |
| Methyl methacrylate [1] | 23 |
| n-Dodecyl mercaptan [1] | 0.25 |
| Potassium persulfate | 0.2 |
| Sodium pyrophosphate | 0.15 |
| Disproportionated rosin soap [2] | 1.0 |
| Water [3] | 75 |

Figure 3:
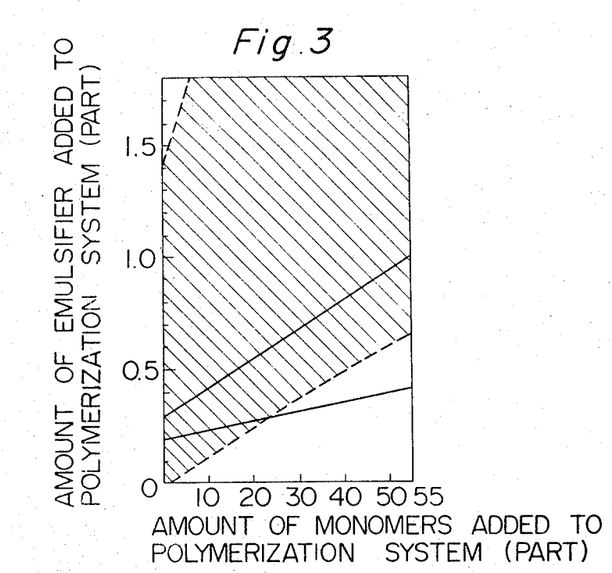

[1] Styrene, methyl methacrylate and n-dodecyl mercaptan were mixed together beforehand, and they were added to the polymer system at a uniform rate for 4.5 hours.
[2] Disproportionated rosin soap in a form of 10% solution was added to the polymer system in accordance with the solid line shown in FIG. 3, and it was continuously trickled at a rate of 0.127 part per 10 parts of the monomer mixture throughout the polymerization.
[3] Water in the SBR latex and the emulsifier aqueous solution was also included.

The polymerization temperature was 70° C. The polymerization was terminated after the stirring had been continued for 2 hours since the completion of the trickling. The properties of the so obtained latex were as follows;

Solids content: 50.4%
pH: 10.4
Brookfield viscosity: 123 cp. (30° C.)
Yield of the coagulated product: 1.7%.

Under the same conditions as in Examples 1 and 2, styrenated phenol was added to this latex as a stabilizer, and the latex was coagulated at 65° C. by sulfuric acid-methanol as a coagulating agent. The coagulated slurry was dehydrated, washed with water and dried to yield a powder of the latex.

After the so prepared powder was pelletized, test pieces were prepared by injection molding as in Examples 1 and 2. The mechanical properties thereof were measured. The results were as follows;

Melt viscosity: 12,000 poise (by a flowtester at 230° C.)
Izod impact strength: 27 kg. cm./cm. notch (room temperature) 16.5 kg. cm./cm. notch (−20° C.)
Yield strength: 310 kg./cm.²
Break strength: 273 kg./cm.²
Break elongation: 45%.

The product was a resin very excellent in transparency.
A product prepared by incorporating a vinyl chloride resin into the so prepared resin had improved processability and impact resistance.

Example 4

As in Examples 1 and 2, FRS–2004 latex (a polybutadiene latex produced by Firestone Co.) was used. As shown in Example 1, the FRS–2004 latex had an average particle size of 0.24μ and contains, as emulsifiers, about 2.7 parts of disproportionated rosin soap and about 0.6 part of potassium oleate per 100 parts of polybutadiene. The polymerization was carried out according to the following recipe.

RECIPE

| Substance: | Parts (solid portion) |
|---|---|
| FRS–2004 | 15 |
| Styrene [1] | 60 |
| Acrylonitrile | 25 |
| n-Dodecyl mercaptan | 0.3 |
| Sodium aldehyde-sulfoxylate | 0.3 |
| Ferrous sulfate | 0.05 |
| Tetrasodium ethylene diamine tetraacetate | 0.1 |

[1] Styrene, acrylonitrile and n-dodecyl mercaptan were mixed together beforehand, and trickled into the polymerization system at a uniform rate after the temperature of the polymer system reached the reaction temperature. The trickling was continued for 8.5 hours.

RECIPE—Continued

| Substance: | Parts (solid portion) |
|---|---|
| Sodium pyrophosphate | 0.15 |
| Cumene hydroperoxide | 0.5 |
| Disproportionated rosin soap [2] | 1.7 |
| Water [3] | 60 |

Figure 4:
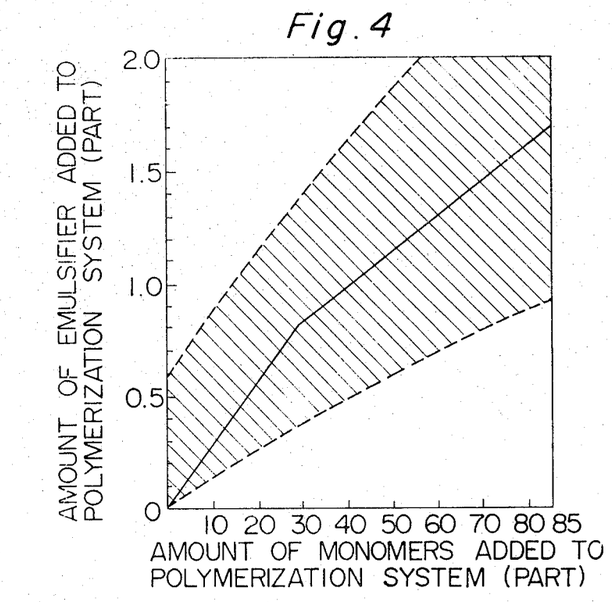

[2] Disproportionated rosin soap in a form of a 10% aqueous solution was continuously added to the polymer system in accordance with the solid line shown in FIG. 4 at a rate of 0.29 part per 10 parts of the monomer mixture added until the amount of the monomer mixture reached 27.5 parts and at a rate of 0.157 part per 10 parts of the monomer mixture after the amount of the monomer mixture added exceeded 27.5 parts.
[3] Water in the polybutadiene latex and the emulsifier aqueous solution was also included.

The polymerization was carried out at 65° C. under nitrogen gas stream. The total polymerization time was 11.5 hours. In the case of adopting such emulsifier recipe as in the present Example, there was no rising of the viscosity throughout the polymerization, the removal of reaction heat was performed very efficiently, and further, the yield of a coagulated product was very low. The final latex had a solid content of 61.8%, a pH value of 9.4 and a Brookfield viscosity of 57 cp. at 30° C., and it was a latex very excellent in mechanical stability.

In the same manner as in Examples 1 and 2 a stabilizer was added to the latex, and the mixture was coagulated by magnesium sulfate. The test results of the physical properties of the so obtained resin were as follows;

Melt viscosity: 2,600 poise (by a flowtester, at 220° C.)
Yield strength: 404 kg./cm.$^2$
Break strength: 347 kg./cm.$^2$
Break elongation: 45%
Izod impact strength: 25 kg. cm./cm. notch (room temperature). 21 kg. cm./cm. notch (low temperature, −20° C.).

The resin was very excellent in processability and had a high impact resistance. Further, it was excellent in whiteness, of which yellow index was 17 and the surface of a shaped article therefrom had an excellent surface gloss.

Control 1

A control example was carried out to compare the effect of the invention with the conventional method. The polymerization was carried out according to the same polymerization recipe as Example 3, except that the amount of water charged was 150 parts and all the emulsifier was added before polymerization.

The resulting latex was coagulated and dried as in Example 3 to obtain the resin.

The resin was tested as in Example 3. The physical properties of the resin were as follows:

Melt viscosity: 3000 poise (at 220° C.)
Yield strength: 400 kg./cm.$^2$
Break strength: 340 kg./cm.$^2$
Break elongation: 25%
Izod impact strength: 15 kg. cm./cm. notch (room temperature) 10 kg. cm./cm. notch (−20° C.)
Whiteness.
Yellow Index: 38.

This result shows clearly the unexpected advantage of the invention.

Example 5

By using an SBR latex (JSR–0561, product of Nippon Gosei Gomu K. K.) as a substrate, the polymerization was carried out according to the following recipe.

JSR–0561 has an average particle size of about 0.3μ and the amount of an emulsifier was decided on the basis of formula (1) to be about 3 parts per 100 parts of the polymer in terms of the amount of disproportionated rosin soap.

RECIPE

| Substance: | Parts |
|---|---|
| SBR latex (JSR–0561) (solid portion) | 30 |
| Styrene [1] | 50 |
| Acrylonitrile [1] | 20 |
| n-Dodecyl mercaptan [1] | 0.3 |
| Sodium formaldehyde sulfoxylate | 0.3 |
| Ferrous sulfate | 0.05 |
| Tetrasodium ethylene diamine tetraacetate | 0.1 |
| Potassium sulfate | 0.1 |
| Cumene hydroperoxide | 0.5 |
| Sodium laurate [2] | 1.4 |
| Water [3] | 57 |

[1] Styrene, acrylonitrile and n-dodecyl mercaptan were mixed together beforehand, and the mixture was trickled at a uniform rate after the temperature of the polymer system reached the reaction temperature. The trickling time was 7 hours.
[2] Sodium laurate was continuously added as a 10% aqueous solution to the polymer system according to the trickling curve shown in FIG. 5, at a rate of 0.35 part per 10 parts of the monomer mixture until the amount of the monomer mixture added reached 20 parts and at a rate of 0.16 part per 10 parts of the monomer mixture after the amount of the monomer mixture added exceeded 20 parts.
[3] Water in the SBR latex and the emulsifier aqueous solution was also included.

The polymerization was carried out at 65° C. under nitrogen gas stream. The total polymerization time was 9 hours.

The latex prepared by the polymerization had such properties as a solid content of 61.2%, a pH value of 10.1, a Brookfield viscosity of 67 cp. (30° C.) and a yield of the coagulum of 2.3%. In the same manner as in Examples 1, 2 and 4, the stabilizer emulsion was added to the so prepared latex, and the mixture was coagulated by magnesium sulfate. The properties of the latex were measured as in Examples 1, 2 and 4. The results are as follows;

Melt viscosity: 5,500 poise (by a flowtester at 220° C.),
Yield strength: 340 kg./cm.$^2$
Break strength: 280 kg./cm.$^2$
Break elongation: 62%
Izod impact strength: 45 kg. cm./cm. notch (room temperature); 18 kg. cm./cm. notch (−20° C.)

The so prepared resin was very excellent in impact strength and processability.

Example 6

The polymerization was carried out in a 15-liter reactor under nitrogen gas stream at a temperature of 65° C. according to the following recipe.

RECIPE

| Substance: | Parts |
|---|---|
| Polybutadiene latex [1] (solid portion) | 50 |
| Polybutadiene latex [1] | 50 |
| Styrene [2] | 36.5 |
| Acrylonitrile [2] | 13.5 |
| n-Dodecyl mercaptan [2] | 0.2 |
| Cumene hydroperoxide | 0.2 |
| Sodium formaldehyde sulfoxylate | 0.3 |
| Tetrasodium ethylene diamine tetraacetate | 0.1 |
| Ferrous sulfate | 0.01 |
| Sodium laurate [3] | 1.15 |
| Sodium pyrophosphate | 0.1 |
| Water [4] | 65.0 |

Figure 6:
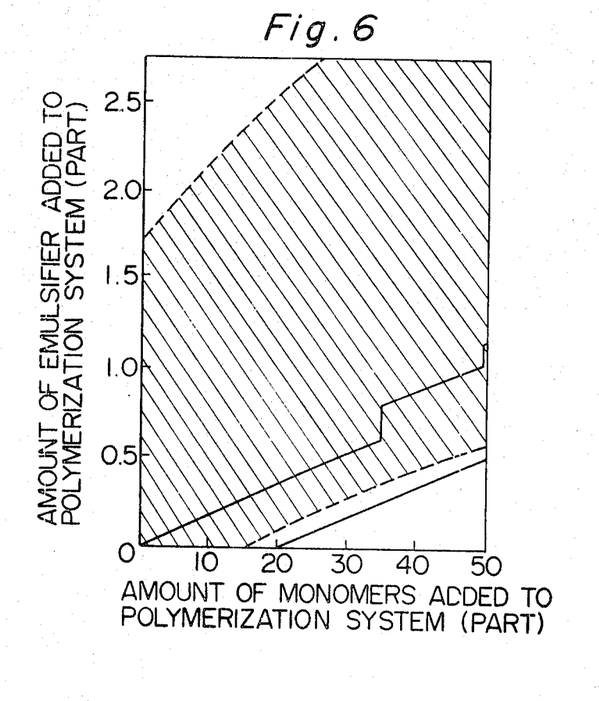

[1] FRS–2004 of Firestone Co.; the solid content of 60%.
[2] The three were mixed together beforehand, and the mixture was continuously added for 5 hours.
[3] Sodium laurate was added as 15% aqueous solution according to the method shown in FIG. 6. Namely, the emulsifier was added at a rate of 0.171 part per 10 parts of the monomer mixture until the amount of the monomer mixture added reached 35 parts and at a rate of 0.133 part per 10 parts of the monomer mixture after the amount of the monomer mixture added exceeded 35 parts, 0.2 part of the emulsifier being added when the amount added of the monomer mixture reached 35 parts. Further 0.15 part of the emulsifier was added after the completion of the addition of the monomer mixture.
[4] Water in the emulsifier solution and the polybutadiene latex was also included.

After the completion of the addition of the monomer mixture, the stirring was continued for 2 hours while controlling the temperature, and then the polymerization was terminated. The viscosity of the polymer system was very low throughout the polymerization, and the yield of a coagulated product was very low. The final latex had the following properties:

Solid content: 61.5% by weight
pH: 8.9
Brookfield: 80 cp. (30° C.)
Yield of a coagulated product: 0.7%
Surface tension: 39 dyne/cm. (30° C.)

The so prepared latex was coagulated by sulfuric acid, dehydrated, washed with water and dried to yield a powder thereof. A mixture consisting of 32 parts of the so prepared powder and 68 parts of a styrene-acrylonitrile copolymer ("CEBIAN N" of Daiseru Kogyo K. K.) was prepared and pelletized. Testing pieces were prepared by injection molding the pellet according to ASTM and the physical properties thereof were measured. The results were as follows:

Tensile yield strength: 410 kg./cm.$^2$
Izod impact strength: 25 kg. cm./cm. notch (23° C.)
Melt viscosity: 7×10$^3$ poise (at 220° C., under 50 kg./cm.$^2$, nozzle of 0.5 mm. x 1.0 mm.)

The so prepared resin was very good in physical properties and the appearance thereof was excellent.

EXAMPLE 7

The polymerization was carried out in a 15-liter reactor under nitrogen gas stream at a temperature of 65° C. according to the following recipe.

RECIPE

| Substance: | Parts |
|---|---|
| SBR latex $^1$ (solid portion) | 60 |
| Methyl methacrylate $^2$ | 21.6 |
| Styrene $^2$ | 15.6 |
| Acrylonitrile $^2$ | 2.8 |
| Sodium formaldehyde sulfoxylate | 0.3 |
| Tetrasodium ethylene diamine tetraacetate | 0.1 |
| Ferrous sulfate | 0.01 |
| Cumene hydroperoxide | 0.2 |
| Sodium pyrophosphate | 0.1 |
| Sodium laurate $^3$ | 1.75 |
| Water $^4$ | 68.0 |

Figure 7:
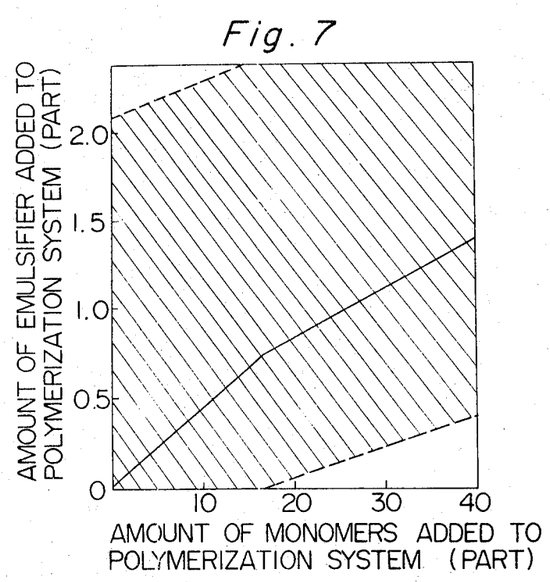

$^1$ A product by emulsion polymerization of 76 parts of butadiene, 24 parts of styrene and 0.2 part of n-dodecyl mercaptan by using disproportionated rosin soap as an emulsifier and potassium persulfate as an initiator; having an average particle size of 0.25μ and a latex solid content of 60%.
$^2$ The three were mixed together beforehand and the mixture was continuously added to the polymer system for 6 hours after the temperature of the polymer system reached 65° C.
$^3$ Sodium laurate was added according to the method shown in FIG. 7 at a rate of 0.441 part per 10 parts of the monomer mixture until the amount of the monomer mixture added reached 17 parts and at a rate of 0.283 part per 10 parts of the monomer mixture after the amount of the monomer mixture added exceeded 17 parts. After the completion of the addition of the monomer mixture 0.35 part of the emulsifier was further added.
$^4$ Water in the SBR latex and the emulsifier solution was also included.

After the completion of the trickling of the monomer mixture, the stirring was continued for 2 hours while controlling the temperature, and then the polymerization was terminated. The viscosity of the polymer system was low throughout the polymerization, and there was hardly any generation of a coagulated product. The properties of the so obtained resin latex were as follows:

Solid content: 60.0%
pH: 9.5
Brookfield viscosity: 90 cp. (30° C.)
Yield of the coagulated product: below 0.5%

This resin latex was treated in the same manner as in Example 6 to obtain the powder of a graft-polymer. It was found that an impact-resistant resin having the following physical properties was obtained by blending the powder at a rate of 30% by weight to a copolymer consisting of 54 parts of methyl methacrylate, 39 parts of styrene and 7 parts of acrylonitrile. Further, the so prepared resin was excellent in transparency.

Tensile yield strength: 400 kg./cm.$^2$ (23° C.)
Izod impact strength: 14 kg. cm./cm. notch (23° C.)
Melt viscosity: 5×10$^3$ poise (220° C., 50 kg./cm.$^2$, 0.5 mm. x 1.0 mm. nozzle)

EXAMPLE 8

The polymerization was carried out in a 15-liter reactor under nitrogen gas stream at a temperature of 65° C. according to the following recipe.

RECIPE

| Substance: | Parts |
|---|---|
| Polybutadiene latex (FRS–2004 of Firestone Co.) (solid portion) | 70 |
| Styrene $^1$ | 21 |
| Acrylonitrile $^1$ | 9 |
| Potassium persulfate | 0.3 |
| Potassium sulfate | 0.15 |
| Sodium pyrophosphate | 0.1 |
| Sodium laurate $^2$ | 0.58 |
| Water | 60.00 |

Figure 8:
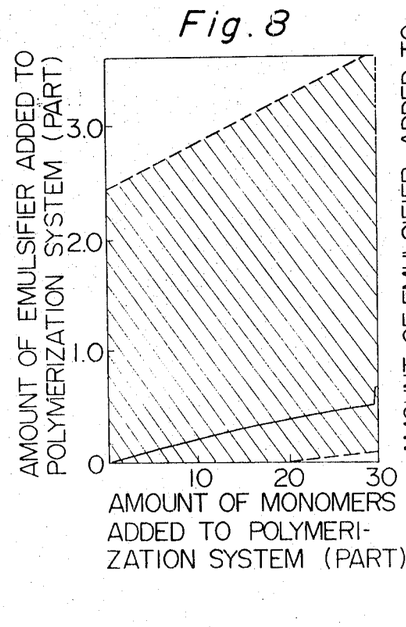
Figure 9:
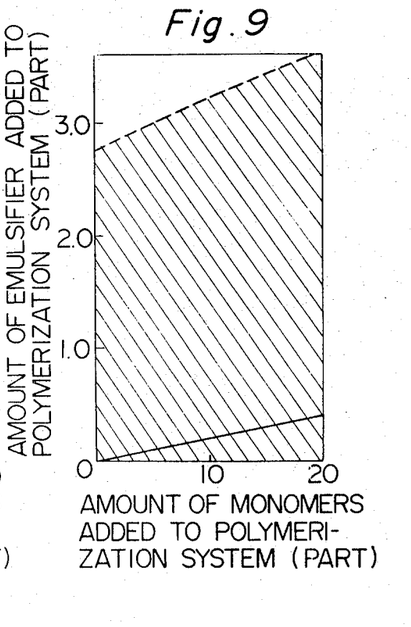

$^1$ The two were mixed together beforehand and the mixture was trickled continuously into the polymer system.
$^2$ The emulsifier was added according to the method shown in FIG. 8 at a rate of 0.2 part per 10 parts of the monomer mixture until the amount of the monomer trickled mixture reached 15 parts and at a rate of 0.133 part per 10 parts of the monomer mixture after the amount of the monomer mixture added exceeded 15 parts. After the completion of the addition of the monomer mixture 0.08 part of the emulsifier was further added.

The total time of the polymerization was 6 hours. The latex prepared by the polymerization had a solid content of 61.5%, a pH value of 9.8 and a Brookfield viscosity of 85 cp. (30° C.), and a yield of a coagulated product was 1.0%. The viscosity of the polymer system was low throughout the polymerization and the polymerization proceeded very stably.

Example 9

The polymerization was carried out in a 15-liter reactor under nitrogen gas stream at a temperature of 65° C. according to the following recipe.

RECIPE

| Substance: | Parts |
|---|---|
| Polybutadiene latex (FRS–2004 of Firestone Co.) (solid portion) | 80 |
| Styrene | 14 |
| Acrylonitrile | 6 |
| Sodium laurate | 0.48 |

Other components and parts thereof were the same as in Example 6. Styrene and acrylonitrile were mixed together beforehand, and added to the polymer system over a period of 2 hours. Sodium laurate was continuously added, according to the method shown in FIG. 4, at a rate of 0.25 part per 10 parts of the monomer mixture.

The polymerization proceeded very stably, and it was terminated when 4 hours had passed since the initiation of the polymerization. As a result, a resin latex having the following properties was obtained.

Solid content: 61.2%
pH: 10.0
Brookfield viscosity: 110 cps. (30° C.)
Yield of a coagulated product: below 0.3%.

Control 2

This Control is to explain the case where the emulsifier was employed in an amount exceeding the upper limit of the specified range. Entirely the same elastomer latex, monomer composition and polymerization conditions as in Example 1 were used, except that 2.0 parts of sodium laurate were used. (0.5 part of the laurate had preliminarily been added to the polymerization system, and 1.5 part thereof was added during polymerization.) Polymerization was carried out while adding the emulsifier so that the linear relationship shown in FIG. 1 was satisfied.

When about 50 parts of the monomer mixture liquid had been trickled, a coagulated product was yielded in an excessive amount in the reaction system, and the content of the reactor was coagulated as a whole (in a crumb-like state).

In this case, the amount of sodium laurate added was the upper limit of the specified range of an emulsifier in the present invention.

Control 3

The method of addition of emulsifier in Example 2 was modified as follows:

(1) (In case the amount of addition of emulsifier was always outside the region of the present invention but in the neighbourhood of the upper limits of the present invention.)

Entirely the same recipe and polymerization conditions as in Example 2 were employed, except that the amount of sodium laurate emulsifier added during the polymerization, was 1.7 parts and this was added so that the curvilinear relation (1) shown in FIG. 2, was satisfied.

The polymerization reaction proceeded smoothly until 40 parts of monomer were added, but then clots began to form rapidly, and when 50 parts of monomer were added so that the curvilinear relation (2) shown in FIG. impossible, and so polymerization became impossible.

(2) (In case the amount of addition of emulsifier was outside the upper limits of the present invention in the initial period of polymerization.)

The same recipe and polymerization conditions as in Example 2 were employed, except that the emulsifier was added so that the curvilinear relation (2) shown in FIG. 2, was satisfied.

Polymerization proceeded smoothly until 65 parts of monomer were added, but then the viscosity of the polymerization system began to increase, and when 75 parts of monomer were added, clots had formed remarkably and continuation of polymerization became impossible.

(3) (In case the amount of addition of emulsifier was below the lower limits of the present invention throughout the polymerization.)

The same recipe and polymerization conditions as in Example 2 were employed, except that the emulsifier was added so that the curvilinear relation (3) shown in FIG. 2, was satisfied.

Polymerization proceeded smoothly until 35 parts of monomer were added, but then clots began to form, and when 50 parts of monomer were added, stirring became impossible on account of the formation of a large amount of clots, and so polymerization was discontinued.

(4) (In case the amount of addition of emulsifier was below the lower limits of the present invention in the initial period of polymerization and thereafter entered the region of the present invention.)

Entirely the same recipe and polymerization conditions as in Example 2 were employed, except that the emulsifier was added so that the curvilinear relation (4) shown in FIG. 2, was satisfied.

Polymerization proceeded smoothly until 55 parts of monomer were added, but when 60 parts of monomer were added, clots had formed remarkably and the continuation of polymerization became impossible.

Control 4

This Control is to explain the case where the amount of emulsifier added deviated from the lower limit of the specified amount of emulsifier.

Entirely the same recipe and polymerization conditions as in Example 6 were employed, except that 0.5 part of sodium laurate was added, and the polymerization was started without adding any emulsifier, and after 20 parts of monomer were added (namely, 2 hours after the commencement of polymerization), the addition of emulsifier was started so that the whole emulsifier might be added in 3 hours.

A coagulated product was yielded in a large amount in the reactor 2.5 hours after the initiation of the trickling of the monomer mixture. Then, the content of the reactor became crumb-like and it was impossible to carry out the stirring.

In this case, the amount of emulsifier added deviated from the lower limit of the specified amount of emulsifier in the present invention as shown in FIG. 6.

Control 5

This Control is to explain the case where the emulsifier, although added in an amount within the specified range, was added all at once.

The following were charged into a reactor:

| | Parts (solid portion) |
|---|---|
| Styrene-butadiene rubber latex [1] | 30 |
| Potassium persulfate | 0.3 |
| Sodium pyrophosphate | 0.1 |
| Potassium sulfate | 0.15 |
| Disproportionated rosin soap | 1.2 |
| Water | 66.0 |

[1] A hot rubber containing styrene at a ration of 23% by weight and 2.7 parts of disproportionated rosin soap and 0.5 part of oleic acid as emulsifiers and having a solid content of 60% and an average particle size of $0.25\mu$.

The atmosphere of the reactor was replaced by nitrogen and the temperature in the reactor was elevated to 65° C. To the reactor, a mixture of 27 parts of styrene, 38 parts of methyl methacrylate, 7 parts of acrylonitrile and 0.5 part of t-dodecyl mercaptan was added at such a uniform rate that the addition might be completed in 7 hours. The viscosity of the latex in the reactor became exceedingly high 4.5 hours after the initiation of the addition of the monomer mixture, and the content of the reactor became crumb-like. The reaction could not be continued thereafter because of the failure of stirring and the insufficiency of the transfer of heat.

Control 6

This Control is to explain the case where the amount of emulsifier added was within the specified range but it was added all at once.

The following were charged into a reactor provided with a stirrer:

| | Parts (solid portion) |
|---|---|
| Polybutadiene latex | 80 |
| Potassium persulfate | 0.3 |
| Sodium pyrophosphate | 0.1 |
| Potassium sulfate | 0.15 |
| Disproportionated rosin soap | 2.0 |
| Water | 7.0 |

The atmosphere of the reactor was replaced by nitrogen and the temperature in the reactor was adjusted to 65° C. To this reaction system, a mixture consisting of 14 parts of styrene and 6 parts of acrylonitrile was continuously added at a uniform rate. When the addition of the monomer mixture was completed, the viscosity of the latex in the reactor became higher. Thirty minutes later, the latex became cream-like.

Control 7

This Control is to explain the case where addition of an emulsifier was carried out at the specified rate but at a certain point the rate of the addition deviated from the specified range.

Entirely the same recipe and polymerization conditions as in Example 3 were employed, except that 0.4 part of sodium rosin soap was used (0.2 part thereof had preliminarily been added to the reaction system and 0.2 part thereof was added during polymerization), and the emulsifier was added rectilinearly as shown in FIG. 3.

When 30 parts of the monomer mixture were added, a coagulated product was formed in a large amount, and when 35 parts were added, the latex became crumb-like.

Control 8

This Control is to explain the case where addition of an emulsifier was carried out at the specified rate but at a certain point the rate of the addition deviated from the specified range.

Figure 5:
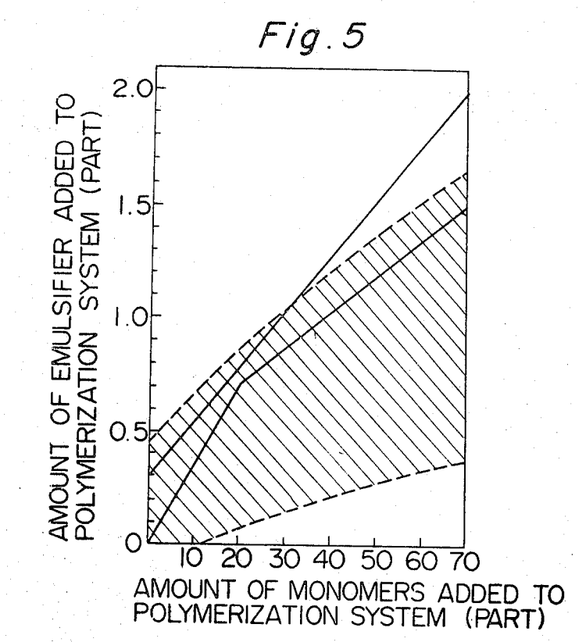

Entirely the same recipe and polymerization conditions as in Example 5 were employed, except that 2.0 parts of sodium laurate were used (0.3 part thereof had preliminarily been added to the polymerization system, and 1.7 parts thereof were added during polymerization), and the emulsifier was added rectilinearly as shown in FIG. 5.

Masses of a coagulated product began to appear in the latex in the reactor 2.5 hours after the initiation of addition of the monomer mixture, and 3.0 hours after initiation the latex became completely crumb-like.

In this case, the amount of emulsifier added deviated from the specified range of an amount added when the coagulated product began to form.

The following Examples are to explain the production of the thermoplastic resins of the present invention.

Example 10

(1) A butadiene-styrene copolymer latex was prepared by the polymerization according to the following recipe.

RECIPE

| Substance: | Parts |
| --- | --- |
| Butadiene | 76.0 |
| Styrene | 24.0 |
| n-Dodecyl mercaptan | 0.2 |
| Disproportionated rosin soap | 2.3 |
| Potassium persulfate | 0.3 |
| Water | 70.0 |

The polymerization temperature was 50–80° C. A part of the emulsifier was added to the polymer system in the early stage of the polymerization, and the remainder was added continuously over a period of the polymerization so that the final latex might have a large particle size.

The properties of the obtained latex were as follows:

Average particle size: 0.22μ
Latex concentration: 56%
Gel content of rubber: 0.75
Swelling Index: 31.0.

(2) The emulsion graft-polymerization was carried out using the latex prepared in (1) above according to the following recipes.

10–(A)
RECIPE (A)

| Substance: | Parts |
| --- | --- |
| Butadiene-styrene copolymer (pure polymer weight by parts) | 25.0 |
| Styrene | 52.5 |
| Acrylonitrile | 22.5 |
| n-Dodecyl mercaptan | 0.4 |
| Sodium aldehyde sulfoxylate | 0.3 |
| Tetrasodium ethylene diamine tetraacetate | 0.1 |
| Ferrous sulfate | 0.01 |
| Disproportionated rosin soap | 1.50 |
| Cumene hydroperoxide | 0.20 |
| Potassium sulfate | 0.15 |
| Water | 65.0 |

The polymerization was carried out at a temperature of 60° C. by adding a mixture of the monomers and mercaptan continuously to the polymer system until the monomers were completely converted to a polymer.

The emulsifier was added continuously over a period of the polymerization according to the above-mentioned formula (1) so that a coagulated product might not be yielded.

The properties of the so obtained elastomeric polymer-containing resin latex were as follows:

Latex concentration: 60.1%
Latex pH: 10.5
Latex viscosity: 180 cp.
Average particle size of latex: 0.35μ

To the so obtained latex was added an aqueous solution of magnesium sulfate and thereby the latex was coagulated at a polymer concentration of 10–15%. The coagulated polymer was dehydrated, washed with water and dried. A polymeric powder was recovered.

10–(B)
RECIPE (B)

| Substance: | Parts |
| --- | --- |
| Butadiene styrene copolymer (pure polymer weight by parts) | 45.0 |
| Styrene | 38.5 |
| Acrylonitrile | 16.5 |
| n-Dodecyl mercaptan | 0.3 |
| Cumene hydroperoxide | 0.2 |
| Sodium aldehyde sulfoxylate | 0.3 |
| Tetrasodium ethylene diamine tetracetate | 0.1 |
| Ferrous sulfate | 0.01 |
| Disproportionated rosin soap | 1.3 |
| Potassium sulfate | 0.1 |
| Water | 80.0 |

The polymerization was carried out at a temperature of 65° C. in the same manner as in 10–(A) to yield an elastomeric polymer-containing resin latex. The obtained latex was characterized by a pH value of 10.5, a concentration of 55.5%, a viscosity of 120 cp. and an average particle size of 0.28μ.

A polymer was recovered by treating the so obtained latex in the same manner as in 10–(A).

10–(C)
RECIPE (C)

| Substance: | Parts |
| --- | --- |
| Butadiene styrene copolymer (pure polymer weight by parts) | 60.0 |
| Styrene | 28.0 |
| Acrylonitrile | 12.0 |
| n-Dodecyl mercaptan | 0.1 |
| Cumene hydroperoxide | 0.2 |
| Sodium aldehyde sulfoxylate | 0.3 |
| Tetrasodium ethylene diamine tetracetate | 0.1 |
| Ferrous sulfate | 0.01 |
| Disproportionated rosin soap | 1.2 |
| Water | 70.0 |

The polymerization was carried out at a temperature of 60° C. in the same manner as in 10–(A) and 10–(B). The so obtained polymer latex had a concentration of 57%, a viscosity as low as 150 cp. and an average particle size of 0.26µ.

(3) The suspension polymerization was carried out in an aqueous medium according to the following recipe to obtain a resinous polymer.

RECIPE

| Substance: | Parts |
|---|---|
| Styrene | 72.0 |
| Acrylonitrile | 28.0 |
| t-Dodecyl mercaptan | 0.7 |
| Azobisisobutyronitrile | 0.3 |
| Suspensor | 0.5 |
| Water | 200.0 |

The polymerization was carried out at a temperature of 65–120° C. until the monomers were completely converted into a polymer. The polymer obtained was transparent and was a bead-like form having a size of about 0.3–0.5 mm. The slurry of polymer was dehydrated by a centrifuge, washed with water and dried. A finely granular powder of the polymer was obtained.

(4) A pelletized resin was prepared by compounding the elastomeric polymer-containing resin powder prepared in (2) above with the resin powder prepared in (3) above at a ratio shown in Table 1 below and further compounding therewith a phenol type anti-oxidant in an amount of one part based on 100 parts of the final resin composition. Test pieces for stretching test and Izod impact strength test were prepared by injection molding the resin composition to ASTM and subjected to such tests. The results are shown in Table 2 below.

As is clear from Table 2, the so prepared resin compositions have high rigidity and exceedingly great impact strength.

Further, such compositions can be easily molded into various complicated pieces and such molded articles are excellent in whiteness and in surface gloss.

TABLE 1

[Compounding ratio of elastomeric polymer-containing resins to resin prepared in Example 10-(3) above]

| Elastomeric polymer-containing resins | Contents of elastomeric polymer in the final resin compositions (parts by weight) | | | | | |
|---|---|---|---|---|---|---|
| 10-(A) | 10 | 15 | 20 | 25 | | |
| 10-(B) | 10 | 15 | 20 | 25 | 30 | 45 |
| 10-(C) | 10 | 15 | 20 | 25 | 30 | 45 |

Example 11

(1) With the same recipe as in Example 10-(2), polymerization was carried out by using as an elastomeric polymer latex a polybutadiene latex (FRS–2004 of Firestone Co., having a latex concentration of 60%, an average particle diameter of about 0.25 micron, a gel content of 0.8 and a gel swelling index of 28). The same care as in Example 2 was taken with respect to the polymerization operation and the manner of adding the emulsifier.

The polymerization recipes are as follows:

11–(A)

| | |
|---|---|
| Polybutadiene (calculated as polymer) | 25.0 |
| Styrene | 52.5 |
| Acrylonitrile | 22.5 |
| n-Dodecyl mercaptan | 0.4 |
| Sodium aldehyde sulfoxylate | 0.3 |
| Tetrasodium ethylene diamine (tetraacetate) | 0.1 |
| Ferrous sulfate | 0.01 |
| Sodium laurate | 1.50 |
| Cumene hydroperoxide | 0.20 |
| Potassium sulfate | 0.15 |
| Water | 65.0 |

(Polymerization temperature: 65° C.)

11–(B)

| | |
|---|---|
| Polybutadiene (calculated as polymer) | 45.0 |
| Styrene | 38.5 |
| Acrylonitrile | 16.5 |
| n-Dodecyl mercaptan | 0.2 |
| Cumene hydroperoxide | 0.2 |
| Sodium aldehydesulfoxylate | 0.3 |
| Tetrasodium ethylene diamine tetraacetate | 0.1 |
| Ferrous sulfate | 0.01 |
| Sodium laurate | 1.2 |
| Water | 65.0 |

(Polymerization temperature: 65° C.)

11–(C)

| | |
|---|---|
| Polybutadiene (calculated as polymer) | 60.0 |
| Styrene | 28.0 |
| Acrylonitrile | 12.0 |
| n-Dodecyl mercaptan | 0.1 |
| Cumene hydroperoxide | 0.2 |
| Sodium aldehydesulfoxylate | 0.3 |
| Tetrasodium ethylene diamine tetraacetate | 0.1 |
| Ferrous sulfate | 0.01 |
| Sodium sulfate | 0.1 |
| Potassium sulfate | 0.1 |
| Water | 65.0 |

(Polymerization temperature: 65° C.)

TABLE 2

[Physical properties of resin obtained in Example 10-(4)]

| Elastomer polymer-containing resin | Properties | Unit | Measurement | Content of elastomeric polymer in final resin composition (part by weight) | | | | | |
|---|---|---|---|---|---|---|---|---|---|
| | | | | 10 | 15 | 20 | 25 | 30 | 45 |
| 10-(A) | Tensile strength at yield | Kg./cm.² | Room temperature | 560 | 467 | 420 | 392 | | |
| | Tensile strength at breakage. | Kg./cm.² | | 487 | 402 | 370 | 344 | | |
| | Elongation at breakage | Percent | | 12 | 18 | 68 | 67 | | |
| | Izod impact strength | Kg. cm./cm. notch | 23° C | 14.2 | 34.0 | 38.0 | 46.2 | | |
| | | | −20° C | 8.3 | 24.2 | 30.3 | 36.5 | | |
| 10-(B) | Tensile strength at yield | Kg./cm.² | Room temperature | 553 | 458 | 413 | 388 | 340 | 280 |
| | Tensile strength at breakage. | Kg./cm.² | | 475 | 389 | 370 | 324 | 282 | 230 |
| | Elongation at breakage | Percent | | 11 | 14 | 56 | 60 | 82 | 91 |
| | Izod impact strength | Kg. cm./cm. notch | 23° C | 15.5 | 37.8 | 45.4 | 55 | 59 | 62 |
| | | | −20° C | 10.1 | 28.3 | 36.8 | 40.0 | 42 | 45 |
| 10-(C) | Tensile strength at yield | Kg./cm.² | Room temperature | 560 | 473 | 420 | 387 | 336 | 287 |
| | Tensile strength at breakage. | Kg./cm.² | | 480 | 393 | 362 | 327 | 280 | 236 |
| | Elongation at breakage | Percent | | 8.8 | 14.8 | 38 | 46 | 75 | 72 |
| | Izod impact strength | Kg. cm./cm. notch | 23° C | 13 | 31 | 42 | 50 | 53 | 60 |
| | | | −20° C | 9.5 | 2.5 | 35.5 | 42 | 43 | 44.8 |

Each of the obtained latices has a pH of 9.5–10.5, a concentration of about 60% and viscosity of 100–200 cp., showing a high concentration and a low viscosity and were also excellent in stability.

Each of the obtained latices were coagulated with magnesium sulfate as a coagulating agent in the same manner as in Example 2, dehydrated, and dried, followed by the recovery of a polymer.

(2) Powder of the polybutadiene-containing resin obtained in Example 11–(1) was compounded with the powder of the styrene-acrylonitrile polymer obtained by the method of Example 10–(3) in accordance with the same recipe as used in Example 10–(4). As a stabilizer, 1.0 part of a phenolic acid-oxidant was added to 100 parts of a final resin composition. The compounded resin powder was extruded through an extruder into a gut form, and cut into pellet form. The pellet was injection molded, and test pieces for tensile test according to ASTM were prepared. The results obtained by measuring their physical properties are shown in Table 3.

It can be understood from Table 3 that the resin composition of the present invention is more excellent in physical properties than the conventional resin of the same kind, particularly showing twice as high an impact strength, and also a high rigidity. It also has a very high whiteness, and is excellent in processability. The surface glossiness of an article shaped from the resulting resin composition is also very excellent.

In the same manner as in Examples 10–(2) and 11–(1), the emulsifier and monomers were added throughout the polymerization period according to the formula (1). The obtained latex had a concentration of 56% and a viscosity of 150 cp. The latex was coagulated with a dilute sulfuric acid, dehydrated, washed with a dilute aqueous caustic soda and water, and dried, followed by the recovery of a polymer in the powdery form.

(2) A monomeric mixture composed of styrene, methyl methacrylate and acrylonitrile was suspension-polymerized according to the following recipe.

POLYMERIZATION RECIPE

| | |
|---|---|
| Styrene | 39.0 |
| Methyl methacrylate | 54.0 |
| Acrylonitrile | 7.0 |
| n-Dodecyl mercaptan | 0.3 |
| Azobisisobutyronitrile | 0.3 |
| Suspending agent | 0.05 |
| Water | 200.0 |

(Polymerization temperature: 65–120° C.)

The polymerization was carried out until it was completely finished, and the polymer was obtained in the form of beads having a particle diameter of 0.3–0.5 mm. The polymer was dehydrated, washed with water, dried, and recovered in a finely divided powder form.

TABLE 3

[Physical properties of the resin obtained in Example 11–(2)]

| Elastomer polymer-containing resin | Properties | Unit | Measurement conditions | Content of elastomeric polymer in final resin composition (part by weight) | | | | | |
|---|---|---|---|---|---|---|---|---|---|
| | | | | 10 | 15 | 20 | 25 | 30 | 45 |
| 11–(A) | Tensile strength at yield | Kg./cm.² | Room temperature | 512 | 450 | 408 | 373 | | |
| | Tensile strength at breakage | Kg./cm.² | | 475 | 392 | 367 | 328 | | |
| | Elongation at breakage | Percent | | 15 | 21 | 73 | 56 | | |
| | Izod impact strength | Kg. cm./cm. notch | 23° C. | 15.0 | 36.2 | 42.0 | 50 | | |
| | | | −20° C. | 9.8 | 26.8 | 34.3 | 38 | | |
| 11–(B) | Tensile strength at yield | Kg./cm.² | Room temperature | 517 | 440 | 400 | 365 | 327 | 267 |
| | Tensile strength at breakage | Kg./cm.² | | 473 | 386 | 306 | 320 | 277 | 220 |
| | Elongation at breakage | Percent | | 13 | 18 | 67 | 75 | 86 | 92 |
| | Izod impact strength | Kg. cm./cm. | 23° C. | 16.1 | 39.4 | 47.6 | 50 | 63 | 66.2 |
| | | | −20° C. | 11 | 29.4 | 37.2 | 40 | 42 | 45 |
| 11–(C) | Tensile strength at yield | Kg./cm.² | Room temperature | 53.2 | 467 | 415 | 387 | 342 | 294 |
| | Tensile strength at breakage | Kg./cm.² | | 460 | 375 | 358 | 330 | 282 | 237 |
| | Elongation at breakage | Percent | | 10.8 | 15.5 | 38 | 47 | 72 | 67 |
| | Izod impact strength | Kg.cm./cm. | 23° C. | 14.7 | 35.3 | 46.8 | 54.2 | 58.0 | 62 |
| | | | −20° C. | 9.5 | 27.8 | 36.1 | 41.7 | 43.0 | 46 |

Example 12

(1) A rubber latex composed of 76 parts of butadiene and 24 parts of styrene which has an average particle diameter of 0.25 micron and a latex concentration of 60% was prepared, and in the presence of this latex, a monomeric mixture consisting of styrene, methacrylic acid and acrylonitrile was polymerized according to the following recipe.

POLYMERIZATION RECIPE

| | |
|---|---|
| Rubbery polymer (calculated as polymer) | 45.0 |
| Styrene | 21.4 |
| Methyl methacrylate | 29.7 |
| Acrylonitrile | 3.9 |
| n-Dodecyl mercaptan | 0.1 |
| Cumene hydroperoxide | 0.2 |
| Sodium laurate | 1.0 |
| Polyoxyethylene alkylphenol ether | 0.2 |
| Sodium aldehydesulfoxylate | 0.3 |
| Tetrasodium ethylene diamine tetraacetate | 0.1 |
| Ferrous sulfate | 0.01 |
| Potassium sulfate | 0.15 |
| Water | 70 |

(Polymerization temperature: 65° C.)

(3) The resin powders obtained in Examples 12–(1) and 12–(2) were compounded so that the content of an elastomeric polymer in a final resin composition might be 10, 20, and 30 parts by weight. One hundred parts of each of the obtained compositions were mixed with 1.0 part of a phenolic stabilizer and 0.5 part of a phosphite-type stabilizer. The mixture was extruded through an extruder into a gut form and cut into pellet form. Test pieces were prepared by injection moulding of the so obtained resin compositions in the same manner as in Examples 10–(4) and 11–(2), and their physical properties were measured. The results are shown in Table 4.

As can be understood from this table, the obtained resin compositions are excellent not only in impact strength and rigidity, but also in transparency. This can be substantiated from the fact that a 1 mm. thick sheet shaped from the obtained resin composition was found to have a total percent transmission of as high as 85%.

TABLE 4

[Physical properties of the resin compositions obtained in Example 12-(3)]

| Physical properties | Unit | Measurement | Content of elastomeric polymer in final resin composition (part by weight) | | |
|---|---|---|---|---|---|
| | | | 10 | 20 | 30 |
| Tensile strength at yield | Kg./cm.² | | 495 | 380 | 320 |
| Tensile strength at breakage | Kg./cm.² | | 389 | 327 | 266 |
| Elongation at breakage | Percent | | 12 | 28 | 47 |
| Izod impact strength | Kg. cm./cm. notch | 23° C | 10.8 | 20 | 35 |
| | | −20° C | 8.7 | 16.5 | 26 |

Example 13

(1) A monomeric mixture composed of alpha-methylstyrene, styrene and acrylonitrile was polymerized according to the following conditions. The polymerization was carried out until the ratio of polymerization reached 98%. An aqueous solution of magnesium sulfate was added to the obtained latex, and the mixture was coagulated, washed with water, and thoroughly dried in vacuum, followed by the recovery of a polymer in powder form.

POLYMERIZATION RECIPE

| | |
|---|---|
| Alpha-methyl styrene | 70 |
| Styrene | 4 |
| Acrylonitrile | 26 |
| n-Dodecyl mercaptan | 0.3 |
| Sodium laurate | 3.0 |
| Potassium persulfate | 0.3 |
| Water | 200 |

(Polymerization temperature: 70° C.)

(2) The resin powder obtained in Example 11-(1)-(B) was compounded with the resin powder obtained in Example 13-(1) so that the content of an elastomeric polymer in a final resin composition might be 15%. One hundred parts of the resulting resin composition were mixed with 1.0 part of a stabilizer, and pelletized. In the same manner as in Examples 10-(4), 11-(2) and 12-(3), the physical properties of this resin composition were measured. It was found to have an apparent melt viscosity (measured at 240° C. by a flow tester) of $20 \times 10^3$ poise, a strength at yield of 510 kg./cm.², a strength at breakage of 445 kg./cm.², an elongation at breakage of 13%, an Izod impact strength of 21 kg. cm./cm. notch at 23° C. and 17 kg. cm./cm. notch at −20° C., and a heat deformation temperature according to ASTM of 102° C. which shows an excellent heat resistance.

An article shaped from this resin composition has excellent surface gloss, and hardly discolored when heated.

What is claimed is:

1. A method of preparing a highly concentrated resinous latex having a solids content of 50–70% by weight directly by emulsion graft polymerization of ethylenically unsaturated monomers on an elastomeric polymer of conjugated diene type hydrocarbon which comprises adding, either incrementally or continuously in the presence of a free radical generator, an emulsifier and 92–20 parts by weight of monomers selected from the group consisting of monoalkenyl aromatic monomers and mixtures thereof with one or more acrylic monomers of the formula:

wherein R is a member selected from the group consisting of hydrogen and methyl and X is a member selected from the group consisting of —CN and —COOR', wherein R' is an alkyl group having 1 to 4 carbon atoms, to 8 to 80 parts by weight calculated as solids portion, of a polymerized conjugated diolefinic hydrocarbon-containing elastomeric, polymer latex, the average particle diameter of the dispersed polymeric particles of which is at least 0.15 micron, said emulsifier being added in an amount corresponding to the amount of said monomers added, as defined by the following formula:

$$9 \times 10^{-24} \frac{MV_0^{1/3}}{SR_0} V^{2/3} > W + W_0 > 4 \times 10^{-24} \frac{MV_0^{1/3}}{SR_0} V^{2/3}$$

wherein W is the number of parts by weight of the emulsifier that is required to be added to the polymerization system per 100 parts by weight of the total charge, when a volume V of polymer and monomers is present in the polymerization system, with the proviso that when W is calculated as zero or a minus number, no emulsifier is added to the polymerization system, $W_0$ is the number of parts by weight, per 100 parts by weight of the total charge, of the amount of emulsifier present in the elastomeric polymer latex, as converted on the basis of the effective molecular area of the emulsifier used in the emulsion polymerization reaction, $R_0$ is the average particle radius (cm.) of the particles of the elastomeric polymer latex, M is the molecular weight of the emulsifier used in the emulsion polymerization reaction, S is the area covered (cm.²) per molecule of the emulsifier used in the emulsion polymerization reaction, the average value of the weight of the several components being used when the emulsifier used is a mixture, $V_0$ is the value obtained by dividing the number of parts of the elastomeric polymer by the specific gravity of the polymer, and V is the value obtained by adding the value $V_0$ to the value obtained by dividing the number of parts by weight of the monomers added to the polymerization system at a certain time during the polymerization by the specific gravity of the polymer which should be formed by the said monomers added until that time, continuing the polymerization at a temperature of 40 to 70° C. and at least in the final stage the polymerization is carried out in an emulsion, the solid content of which is 50 to 70% by weight.

2. The method of claim 1 wherein said elastomeric polymer is polybutadiene.

3. The method of claim 1 wherein said elastomeric polymer is a butadiene-styrene copolymer.

4. The method of claim 1 wherein said monoalkenyl aromatic monomer is styrene.

5. The method of claim 1 wherein said emulsifier is selected from the group consisting of the anionic surfactants and mixtures of anionic surfactants with nonionic surfactants.

6. The method of claim 1 wherein the elastomeric polymer latex includes the emulsifier within an amount of the range defined by the formula $$9 \times 10^{-24} \frac{MV_0}{SR_0} > W_0 > 4 \times 10^{-24} \frac{MV_0}{SR_0}$$

References Cited

UNITED STATES PATENTS

| 2,520,959 | 9/1950 | Powers | 260—92.8 R |
| 3,436,440 | 4/1969 | Abe et al. | 260—880 R |
| 3,442,979 | 5/1969 | Ott et al. | 260—880 R |

ALLAN LIEBERMAN, Primary Examiner

T. DeBENEDICTIS Sr., Assistant Examiner

U.S. Cl. X.R.

260—29.6 RB, 29.7 T, 880 R